United States Patent Office 2,920,108
Patented Jan. 5, 1960

2,920,108
PROCESS FOR PREPARING TRIACETYL BENZENE

Theodore E. Bockstahler, Moorestown, N.J., and Benjamin F. Aycock, Wyncote, and Andrew Carson, Philadelphia, Pa., assignors to Rohm & Haas Company, Philadelphia, Pa., a corporation of Delaware No Drawing. Application November 6, 1957
Serial No. 694,716

7 Claims. (Cl. 260—592)

This invention relates to a trimerization of lower esters of hydroxymethylene acetone to yield triacetyl benzene. This invention also relates to a preparation of triacetyl benzene from metallic derivatives of formyl acetone. The lower esters of hydroxymethylene acetone are a new and valuable class of compounds which are disclosed in our co-pending application Serial No. 694,715, filed on an even date. The said esters are prepared by acylation of stable metallic derivatives of formyl acetone with acyl halides and acid anhydrides.

1,3,5-triacetyl benzene is a known valuable chemical. Various attempts have been made to prepare it efficiently. Generally, the reaction product of sodium methylate, acetone, and methyl formate is reacted with acetic acid to give limited yields of relatively impure triacetyl benzene. Similar attempts with other acids—such as boric acid, phosphoric, or sulfuric acids—give no improvements in yields and in the purity of the products. Generally, these attempts to prepare triacetyl benzene are quite unsatisfactory because of the competing reaction of the intermediate sodioformyl acetone with water to yield as by-products formic acid and acetone. It was therefore quite unexpected to find an efficient method for preparing triacetyl benzene in improved and satisfactory yields that has none of the serious limitations of conventional methods.

We have discovered that trimerization of the lower esters of hydroxymethylene acetone yields triacetyl benzene in an efficient manner and in very good yields. The lower esters of hydroxymethylene acetone may be represented by the general formula

$$CH_3COCH=CHOCO-R$$

where R is a straight or branched-chain alkyl group containing from 1 to 4 carbon atoms. Typical groups are: methyl, ethyl, butyl, isopropyl, propyl, isobutyl, and the like.

Illustrative of these esters, there may be named: β-acetylvinyl acetate, β-acetylvinyl propionate, β-acetylvinyl n-butyrate, β-acetylvinyl n-valerate, β-acetylvinyl isovalerate, and β-acetylvinyl isobutyrate.

In accordance with our invention, the trimerization is effectuated in the presence of water by heating. While a trace of water may be employed, in the preferred embodiment of this invention, enough water is used to initiate the reaction, to act as a solvent, and to facilitate handling of the resulting triacetyl benzene. Generally, a volume of water from two to ten times, and preferably from three to five times, the weight of the original esters of hydroxymethylene acetone is employed. In conjunction with water, there may be used other inert organic solvents.

The temperature of the reaction medium is preferably that which corresponds to the reflux or boiling temperature thereof. The temperature when water alone is used as the solvent medium may be from about 60° to 100° C., and preferably from about 90° to 105° C., at normal atmospheric pressure. Lower temperatures undesirably tend to decrease the yield. Higher temperatures may be realized when the reaction is carried out under pressures above normal atmospheric. If desired, there may be used a small amount of acid during the initial stages of the reaction. As the trimerization proceeds, triacetyl benzene precipitates out of solution. The progress of the reaction may be determined by following the formation of acidity in the reaction medium. Generally, the formation of triacetyl benzene is substantially complete in about two to four hours. If desired, the acid produced of the reaction may be distilled from the reaction. The reaction medium may be buffered if desired with, for instance, sodium or potassium phosphate. The solid triacetyl benzene is separated from residual liquid medium by any convenient method, such as filtration. Triacetyl benzene is obtained in yields over 85% and in a high degree of purity.

We have also found that triacetyl benzene may be prepared in good yields by reacting, under anhydrous conditions in the presence of an organic inert solvent, a metallic derivative of formyl acetone with an acid anhydride and/or an acyl halide, by then heating the mixture in the presence of water to remove solvent and to form triacetyl benzene. In the preferred embodiment of our invention, there are reacted salts or chelate salts of formyl acetone with an acid anhydride or an acyl halide.

This reaction is usually exothermic and vigorous. Hence, it is preferable, particularly in the early stages of the reaction to employ convenient methods for cooling the reaction system such as by the use of an ice bath in order to maintain a convenient reaction speed. This is especially so when a low boiling acetyl halide or acid anhydride is employed. Also, it is frequently convenient to add the anhydride or halide slowly to the salt of formyl acetone in order to minimize some of the somewhat undesirable effects of the exothermic nature of the reaction. The exothermic nature of the reaction permits determination of its progress.

Temperatures in the range of about 10° to about 65° C. are advantageously employed. Usually temperatures in the range of about 30° to about 50° C. are somewhat preferred. At temperatures below 10° C., the reaction rate is undesirably slow while at temperatures exceeding 60° C. reduced yields may be obtained.

Atmospheric pressures are usually employed. However, if desired, subatmospheric or superatmospheric pressures may satisfactorily be used, particularly if the properties of the contemplated acetyl halide or acid anhydride and reaction temperature suggest such conditions.

When the exotherm levels off, it is generally an indication that the reaction between the acylating agent and the formyl acetone salt is substantially complete. This is generally achieved in about 2 to 4 hours, somewhat longer periods of time being required for the lesser reactive acylating agents. If desired, to insure completeness of the reaction, there may be carried out additional mixing and/or mild heating in the range of about 30° to 50° C., for any convenient period of time, such as an additional period of 5 to 20 hours.

The present reaction is essentially an equimolecular one. It is generally the practice to employ stoichiometric amounts, and advantageously to employ about 2 to 7% less than stoichiometric of the particular acylating agent than of the formyl acetone salt. Amounts of acylating agent in excess of stoichiometric appear to be less desirable.

The type of derivative of formyl acetone that may be used may be represented by the general formula

$$CH_3COCH=CHOM$$

where M is a metal. Generally useful are alkaline metals of an atomic number from 3 to 19 inclusive in group IA of the periodic chart of the elements, including lithium, sodium, and potassium; polyvalent metals having an atomic number from 22 to 30, including titanium, vanadium, chromium, manganese, copper, zinc, iron, cobalt, and nickel—the latter three in Group VIII of the periodic chart; and the elements of atomic number from 13 to 14 inclusive, including aluminum and silicon. The alkali metal salts are preferred because of availability and convenience. The chelated salts of formyl acetate may advantageously be used when increased solubility in the solvent may be desired.

With these metallic derivatives there may be reacted at least one acid anhydride and/or an acyl halide of the general formula

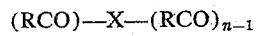

$$(RCO)-X-(RCO)_{n-1}$$

where R is an alkyl group containing from 1 to 4 carbon atoms, $n$ represents an integer from 1 to 2 inclusive, X represents an oxygen atom or Y, and Y represents a halogen atom of an atomic number from 17 to 53 inclusive—with the proviso that when $n$ is equal to one, then X represents Y; and when $n$ is equal to two, then X is an oxygen atom. Such metallic derivatives contain 2 to 10 carbon atoms.

Typical alkyl groups are methyl, ethyl, propyl, isopropyl, butyl, isobutyl, and sec-butyl. Halogen atoms of atomic number from 17 to 53 include chlorine, bromine, and iodine.

Typical acid anhydrides that may be employed to react with salts of formyl acetone include acetic anhydride, propionican hydride, n-butyric anhydride, n-valeric anhydride, and isobutyric anhydride.

Typical acyl halides that may be used in this invention include acetyl chloride, acetyl bromide, propionyl chloride, acetyl iodide, isobutyryl chloride, n-butyryl chloride, n-valeryl chloride, isovaleryl chloride, propionyl iodide, butyryl bromide, and isobutyryl chloride.

Amongst the acid anhydrides and acetyl halides, acetic anhydride and acetyl chloride are now preferred. Acetyl fluoride is avoided because of its undue reactivity. If desired, mixtures of acyl halides and acid anhydrides or mixtures of members of these two classes may be used to react with the salts of formyl acetone.

The anhydrides and acyl halides that may be used are further characterized in having one to two carbonyl groups but as being free of adjoining methylenic carbonyl groups such as occur in ketenes.

The solid salts of formyl acetone are preferably dispersed or dissolved in an inert, organic, volatile solvent, especially of the non-polar type. The solvents promote the reaction of the salt of formyl acetone and the defined acyl halides or acid anhydrides. Suitable for use as solvent, there may be used benzene, toluene, methylene dichloride, xylene, chloroform, dry ether; hydrocarbon solvents such as naphtha, hexane, and pentane; and mixtures of such solvents. When the reaction between the salt of formyl acetone and the defined reactants is substantially completed, there is added water to the reaction mixture. Although triacetyl benzene may be produced from the reaction mixture by heat alone, it is preferred to add water to provide a satisfactory vehicle and medium for recovery of the triacetyl benzene. Hence, it is preferable to provide a total water in an amount from two to ten, and preferably three to five, times the weight of original formyl acetone used.

Water replaces the organic solvent and promotes the recovery of the solvents and that of any alcohols that may be present. This may be the case when, instead of using a metallic salt of formyl acetone as starting material, it is desired to prepare the salt in situ by starting the reaction with acetone, a convenient formate, and the desired alkaline metal alkoxide. Hence, during distillation there may be removed organic solvents and alcohols separately or in azeotropic mixtures. When substantially all organic solvents and/or alcohols have distilled off, the aqueous reaction mixture is heated, preferably to its refluxing temperature. The temperature range may be from about 60° to about 100° C., and preferably from about 90° to about 105° C. at normal atmospheric pressures. Triacetyl benzene is formed. If desired, the progress of the reaction may be estimated by distilling off acid which is formed during the reaction. When substantially all of the acid has come over, the reaction is substantially completed. Substantially all the triacetyl benzene is formed in three to four hours. To insure completeness of the reaction, heating at reflux may be continued for an additional period of time, such as for one to five hours, for instance. The reaction mixture is then cooled and solid is filtered out. It is washed with water and dried.

This invention may be illustrated by the following examples, which are not to be construed as limitations of the scope of this invention but rather as illustrations of a preferred manner for carrying out the subject matter of our discovery. All parts are by weight.

*Example 1*

There are placed 55.5 parts of β-acetylvinyl acetate and 190 ml. of water into a three-necked flask equipped with a thermometer, stirrer, and reflux condenser. The flask is placed into a heating bath, and the reaction mixture is heated to reflux for about three and a half hours. The reaction mixture is then cooled and filtered. Triacetyl benzene is collected. It has a melting point of 155° to 158° C. The yield based on β-acetylvinyl acetate is 88.7%. When 100 ml. of water is employed, trimerization is somewhat more sluggish.

*Example 2*

There are introduced into a round-bottom, three-necked flask, equipped as above, 61.5 parts of β-acetylvinyl propionate and 300 ml. of water. The reaction mixture is heated on a steam bath. The mixture refluxes vigorously. The temperature is in the range of 95° to 105° C. Refluxing is continued for about four hours. The reaction mixture is cooled and filtered. Triacetyl benzene is collected in good yields. When a lower temperature in the range of 60° to about 90° C. is employed, the reaction takes a somewhat longer time to completion.

*Example 3*

In a similar manner, β-acetylvinyl n-butyrate, β-acetylvinyl n-valerate, and β-acetylvinyl isobutyrate, when trimerized by heating in the presence of 4 to 8 parts of water for each part of ester at refluxing temperatures for periods of time of about one to four hours, yield triacetyl benzene.

*Example 4*

A mixture of 42.5 parts of β-acetylvinyl isovalerate and 400 parts of water is heated to reflux (110° C.). Stirring and refluxing are maintained for about five hours, during which time triacetyl benzene precipitates. The solid is collected after cooling to 20° C., washed, and dried.

*Example 5*

To a 500-ml., three-necked flask equipped with stirrer, reflux condenser, thermometer, dropping funnel, and drying tube, there are charged 300 ml. of dry benzene and 50 parts of the sodium salt of formyl acetone (SFA). The slurry is stirred and cooled to 15° C. There is added over a period of one-half hour 46 parts of acetic anhydride. Agitation is maintained for eight hours at a temperature of about 20° to 30° C. Water, 75 ml., is added and the temperature is raised by immersing the flask into a heated water bath. When substantially all the benzene has been removed, the temperature of the mixture is raised to refluxing, or about 104° C. After one hour, the mixture is cooled; the triacetyl benzene solid is filtered out, washed, dried, and obtained in an 85% yield based on pure SFA.

Example 6

To a 500-l., three-necked flask equipped with a stirrer, thermometer, and dropping funnel, there is charged 24.5 parts of 99% sodium methoxide dispersed in 300 ml. of dry benzene. The mixture is warmed to 50° C.; and a mixture of 28.3 parts of methyl formate and 27.4 parts of acetone is added drop-wise over fifteen minutes at 50° to 60° C., immersing the reaction flask into a cooling bath when required. Heating and stirring is continued for two hours at 50° to 60° C. The slurry is cooled to about 15° C.; and 46.0 parts of acetic anhydride are added, while stirring, in small portions over a period of two hours. The temperature is maintained within the range of 40° to 50° C. After two and half hours, no further cooling is necessary. Water, 75 ml., is added while the mixture is heated slowly. When substantially all the methanol and benzene have distilled off, the mixture is heated at total reflux and maintained at a temperature of about 104° C. for two hours. The mixture is then cooled, and the solid is filtered out and washed with water. There is obtained a 72% yield of triacetyl benzene based on sodium methoxide. This product may be oxidized to trimesic acid.

The procedure outlined above is repeated. When substantially all methanol and benzene have distilled off, the mixture is heated at total reflux and maintained at a temperature of about 105° C. for two hours. At that time, water and acetic acid are distilled off. Acetic acid is titrated; and, from its amount, there is determined the rate and extent of the conversion to triacetyl benzene. A 72% yield is found.

Instead of sodium methoxide, there are used sodium butoxide, sodium ethoxide, sodium tert-butoxide, potassium isopropoxide, potassium methoxide, and potassium ethoxide. Other similar alkali metal alkoxides are used with satisfactory results. Instead of methyl formate, there are used other formate esters—preferably the lower alkyl formate esters such as ethyl formate, propyl, butyl, sec-butyl, and the like. The alcohols resulting from the particular formate or alkoxide employed are distilled off in the course of the process of this invention when organic solvent is removed from the system.

Example 7

Following the same general procedure as in Example 6, the reaction is started with 97 parts of sodium salt of formyl acetone. The salt is dispersed in 500 ml. of toluene and reacted with acetic anhydride while maintaining the temperature within the range of 30° to 55° C. and stirring. Seven hundred milliliters of water are added when the exothermic reaction subsides. Toluene and water are then distilled off. The solid product is triacetyl benzene.

Example 8

Following the same general procedure as in Example 6, there is reacted by mixing 104 parts of the potassium salt of formyl acetone dispersed in 500 ml. of toluene with acetyl chloride. The temperature is maintained by cooling and stirring in the range of 50° to 60° C. As the exotherm subsides, after about three hours, 1 liter of water is added and the toluene is distilled off. Heating under total reflux at a temperature of about 105° C. is continued for about three hours. The mixture is cooled and filtered, and triacetyl benzene is collected.

Comparable results are obtained when there are used manganese, copper, iron, aluminum, and other similar chelate salts.

Example 9

To a flask equipped as in prior experiments, there are charged 97 parts of sodium salt of formyl acetone in benzene. To this dispersion there is mixed gradually 35.1 parts of acetyl chloride. The temperature is maintained at about 40° to 50° C. by occasional cooling in a water bath. The mixture is stirred for six hours, and there is added then 100 ml. of water. At 69° C., a benzene-water azeotrope distills off. When the major portion of the benzene is distilled off, the temperature is raised and maintained at full refluxing, 103° to 106° C. A solid is formed. After one hour, the mixture is cooled; and triacetyl benzene is collected by filtration.

In the above example, there is replaced acetyl chloride by acetyl bromide, propionyl chloride, isobutyryl chloride, and acetyl iodide. Following the same general procedure, triacetyl benzene is obtained.

Example 10

To a three-necked flask equipped as described above, there are charged 24.5 parts of (99%) sodium methoxide dispersed in 300 ml. of dry benzene. The mixture is warmed to a temperature range of 50° to 60° C.; and drop-wise, over a period of fifteen minutes, there are added 28.3 parts of methyl formate and 27.4 parts of acetone. Heating and stirring is continued for two hours at 50° to 60° C. At that time, the mixture is cooled to 15° C.; and there is added, over one-half hour, 54 parts of isovaleryl chloride. The mixture is stirred, and the temperature is held at 45° to 55° C. by heating for an additional four hours. There is then added 1 liter of water; and upon heating, methanol and benzene are distilled off. When substantially all solvent is removed, heating at 105° C. under total reflux is maintained for four hours. Upon cooling and filtering out the solid, there is obtained triacetyl benzene.

With potassium isopropoxide the reaction proceeds in a similar manner, there being distilled off isopropanol and benzene. When isovaleryl anhydride is employed, triacetyl benzene is obtained in similar fashion.

Example 11

In similar fashion, there are reacted 22.3 parts of sodium ethoxide in 310 ml. of dry benzene, 34.6 parts of ethyl formate and acetone. To the cooled mixture, there is gradually added 47.6 parts of butyryl chloride. The mixture is heated for three and a half hours at 55° C. There are added 700 ml. of water and as heating is continued, ethanol and benzene distill off. When substantially all solvents are removed, heating at about 106° C., under total reflux, is continued for four hours. The mixture is cooled and upon filtering, there is obtained triacetyl benzene.

Similarly, triacetyl benzene is obtained from butyric anhydride, n-valeric anhydride and isobutyric anhydride.

We claim:

1. A process for preparing triacetyl benzene which comprises heating in the presence of water an ester of hydroxymethylene acetone of the formula $$CH_3COCH=CHOCO-R$$

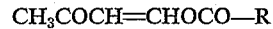

in which R is an alkyl group containing from one to four carbon atoms.

2. A process for preparing triacetyl benzene which comprises heating at reflux in the presence of water an ester of hydroxymethylene acetone of the formula $$CH_3COCH=CHOCO-R$$

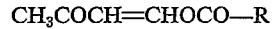

in which R is an alkyl group containing from one to four carbon atoms.

3. A process for preparing triacetyl benzene which comprises heating within a temperature range from about 90° C. to 105° C., and in the presence of water, an ester of hydroxymethylene acetone of the formula $$CH_3COCH=CHOCO-R$$

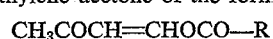

in which R is an alkyl group containing from one to four carbon atoms.

4. A process for preparing triacetyl benzene which comprises heating β-acetylvinyl acetate within a temperature range from about 90° C. to refluxing temperature.

5. A process for preparing triacetyl benzene which comprises heating β-acetylvinyl n-butyrate within a temperature range from about 90° C. to refluxing temperature.

6. A process for preparing triacetyl benzene which comprises heating β-acetylvinyl n-propionate within a temperature range from about 90° C. to refluxing temperature.

7. A process for preparing triacetyl benzene which comprises heating β-acetylvinyl isobutyrate within a temperature range from about 90° C. to refluxing temperature.

References Cited in the file of this patent

Shriner Organic Syntheses, vol. 27, pgs. 91–3 (1947).
Mowry et al., J. Am. Chem. Soc., vol. 72, pgs. 2037–8 (1950).